United States Patent
Lee et al.

(10) Patent No.: US 11,323,265 B2
(45) Date of Patent: May 3, 2022

(54) STORAGE DEVICE PROVIDING HIGH SECURITY AND ELECTRONIC DEVICE INCLUDING THE STORAGE DEVICE

(71) Applicant: SAMSUNG ELECTRONICS CO., LTD., Suwon-si (KR)

(72) Inventors: Yoonjick Lee, Suwon-si (KR); Sunghyun Kim, Suwon-si (KR); Junho Huh, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 78 days.

(21) Appl. No.: 16/698,093

(22) Filed: Nov. 27, 2019

(65) Prior Publication Data
US 2020/0358618 A1 Nov. 12, 2020

(30) Foreign Application Priority Data
May 8, 2019 (KR) .................. 10-2019-0053736

(51) Int. Cl.
*H04L 9/32* (2006.01)
*G11C 17/14* (2006.01)
*H04L 9/08* (2006.01)

(52) U.S. Cl.
CPC .......... *H04L 9/3242* (2013.01); *G11C 17/146* (2013.01); *H04L 9/0819* (2013.01); *H04L 9/0861* (2013.01); *H04L 9/3228* (2013.01)

(58) Field of Classification Search
CPC ... H04L 9/3242; H04L 9/0819; H04L 9/0861; H04L 9/3228; G11C 17/146
See application file for complete search history.

(56) References Cited

U.S. PATENT DOCUMENTS

| | | | |
|---|---|---|---|
| 6,832,317 B1 * | 12/2004 | Strongin | G06F 21/85 713/168 |
| 8,291,226 B2 | 10/2012 | Chun et al. | |
| 8,949,621 B2 | 2/2015 | Nagai et al. | |
| 9,053,317 B2 | 6/2015 | Shieh et al. | |
| 9,087,220 B2 | 7/2015 | Chang et al. | |
| 9,385,871 B2 | 7/2016 | Kang et al. | |
| 10,691,837 B1 * | 6/2020 | Martel | H04L 9/0822 |
| 2006/0107047 A1 * | 5/2006 | Bar-El | G11B 20/00246 713/168 |
| 2009/0007275 A1 * | 1/2009 | Gehrmann | G06F 21/64 726/27 |
| 2012/0210115 A1 * | 8/2012 | Park | H04L 9/3247 713/2 |
| 2014/0006738 A1 * | 1/2014 | Nagai | G06F 21/78 711/163 |
| 2014/0123320 A1 * | 5/2014 | Isozaki | G06F 21/44 726/29 |

(Continued)

FOREIGN PATENT DOCUMENTS

JP 2014-175758 A 9/2014

*Primary Examiner* — Techane Gergiso
(74) *Attorney, Agent, or Firm* — Lee IP Law, PC

(57) ABSTRACT

A storage device includes a basic memory to store a message received from an external device, a security memory to store an authentication key for authenticating the message, a controller to output a control signal, and a security engine to obtain the authentication key from the security memory with an authority to access the security memory in response to the control signal from the controller and to block an access of the controller to the security memory.

9 Claims, 11 Drawing Sheets

(56) References Cited

U.S. PATENT DOCUMENTS

| | | | |
|---|---|---|---|
| 2014/0237611 A1* | 8/2014 | Dent | G06F 21/64 |
| | | | 726/26 |
| 2014/0245427 A1* | 8/2014 | Nagai | G06F 21/78 |
| | | | 726/16 |
| 2015/0294123 A1* | 10/2015 | Oxford | H04L 63/061 |
| | | | 713/193 |
| 2016/0070656 A1 | 3/2016 | Babu et al. | |
| 2016/0140357 A1* | 5/2016 | Newell | G06F 21/79 |
| | | | 726/2 |
| 2016/0380772 A1* | 12/2016 | Gopal | H04L 9/0643 |
| | | | 713/170 |
| 2017/0063853 A1* | 3/2017 | Lim | H04L 9/3242 |
| 2017/0366354 A1* | 12/2017 | Alomair | H04L 63/126 |
| 2018/0145992 A1* | 5/2018 | Bernard | G06F 21/554 |
| 2018/0314626 A1 | 11/2018 | Kuo | |
| 2019/0043600 A1* | 2/2019 | Saileshwar | G06F 11/1048 |
| 2019/0080091 A1* | 3/2019 | Kim | H04L 9/0866 |

\* cited by examiner

STORAGE DEVICE PROVIDING HIGH SECURITY AND ELECTRONIC DEVICE INCLUDING THE STORAGE DEVICE

CROSS-REFERENCE TO RELATED APPLICATION

Korean Patent Application No. 10-2019-0053736, filed on May 8, 2019, in the Korean Intellectual Property Office, and entitled: "Storage Device Providing High Security and Electronic Device Including the Storage Device," is incorporated by reference herein in its entirety.

BACKGROUND

1. Field

Embodiments relate to a storage device and an electronic device, and more particularly, relate to a storage device performing a security function and an electronic device including the storage device.

2. Description of the Related Art

According to development of information technologies, significance of communication between electronic devices has been increased. The electronic devices may be implemented with one of storage devices that are capable of storing data, e.g., a smartphone, a tablet personal computer (PC), a laptop PC, and a wearable device. The electronics devices may exchange data from each other.

The electronic devices may be classified as a sender and a receiver. For example, the sender may output internal data to the receiver, and the receiver may receive the data from the sender. The sender may instruct the receiver to perform an operation by sending a message. When the receiver receives the message from the sender, the receiver may perform an operation indicated by the message.

However, the message from the sender may be hacked or modified by an attacker when the message is transferred from the sender to the receiver. Thus, in order to prevent the hacking by the attacker, the receiver may perform an operation indicated by the message after checking whether the message is output from an authorized sender or whether the message is not modified by the attacker.

SUMMARY

Embodiments are directed to a storage device. The storage device may include a basic memory to store a message received from an external device; a security memory to store an authentication key for authenticating the message; a controller to output a control signal; and a security engine to obtain the authentication key from the security memory with an authority to access the security memory in response to the control signal from the controller and to block an access of the controller to the security memory.

Embodiments are directed to an electronic device. The electronic device may include a basic memory to store a message and a first message authentication code sent from an external device; a security memory to store an authentication key for authenticating the message; a controller to output a control signal; and a security engine to obtain the authentication key from the security memory and to generate a second message authentication code in response to the control signal from the controller. The authentication key is blocked by the security engine from being transferred from the security memory to the controller.

Embodiments are directed to a storage device. The storage device may include a basic memory to store a message; a security memory to store an authentication key for protecting the message; a controller to output a control signal; and a security engine to obtain the authentication key from the security memory with an authority to access the security memory in response to the control signal from the controller, to generate a message authentication code based on the authentication key, and to block an access of the controller to the security memory.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
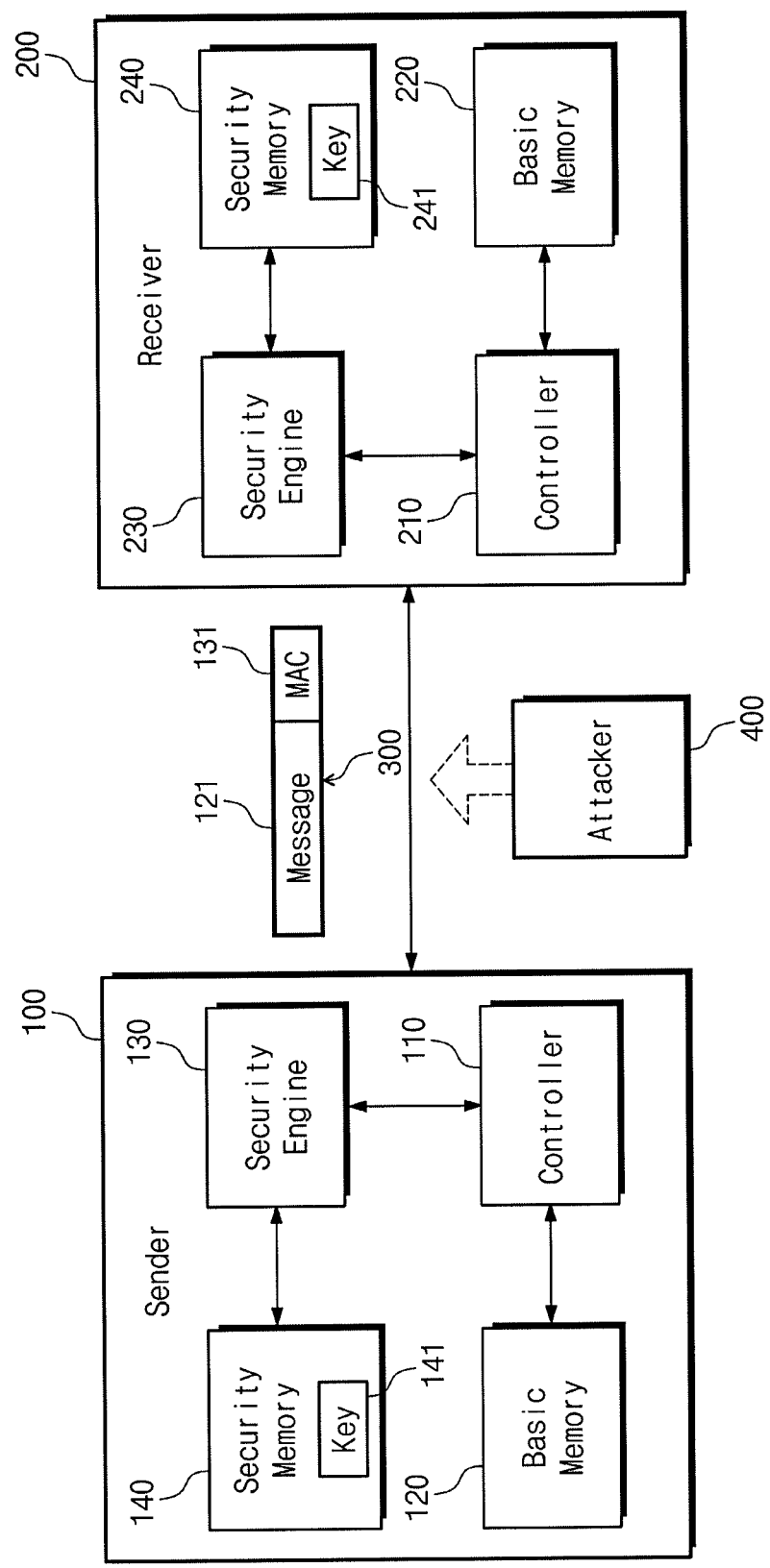
FIG. 1 illustrates a sender and a receiver according to an example embodiment.

FIG. 1 illustrates a sender and a receiver according to an example embodiment.

Referring to FIG. 1, a sender 100 and a receiver 200 may be electronic devices that perform a security function according to an example embodiment. The sender 100 and the receiver 200 may be implemented with one of storage devices that is capable of storing data, e.g., a smartphone, a tablet personal computer (PC), a laptop PC, and a wearable device.

For example, the sender 100 may send a security signal 300 to the receiver 200.

The security signal 300 may include a message 121 and a message authentication code 131. The message 121 may include information regarding an operation of the receiver 200 that is instructed by the sender 100. The message authentication code 131 may be used for determining whether the message 121 is authenticated or not by the receiver 200.

The sender 100 and the receiver 200 may be operated with a high security level by improving safety of a key 141 of the sender 100 and a key 241 of the receiver 200. The keys 141 and 241 may be an authentication key or a security key for communication between the sender 100 and the receiver 200. For example, when the safety of the keys 141 and 241 is improved, a probability that the keys 141 and 241 are exposed to an attacker 400 may be lower. The attacker 400 may be an electronic device or a system outside the sender 100 and the receiver 200. The attacker 400 may intercept and modify the message 121 from the sender 100. For example, the attacker 400 may send the modified message 121 to the receiver 200. Further, the attacker 400 may generate a fake message and send the fake message to the receiver 200 such that the receiver 200 may be consider the fake message as the message 121 from the sender 100. For example, when the keys 141 and 241 are exposed to the attacker 400, the receiver 200 may not recognize or detect whether the message 121 is modified or whether a message is sent from the attacker 400 instead of the sender 100. According to an example embodiment, the sender 100 and the receiver 200 may improve the security level of the message 121 by preventing the keys 141 and 241 from being exposed to the attacker 400.

The receiver 200 may check or evaluate the message 121. For example, when the receiver 200 checks the message 121, the receiver 200 may check or determine whether the message 121 is sent from the authenticated sender 100 and whether the message 121 is not modified by the attacker 400 when the message 121 is transferred. Further, when a message is authenticated by the receiver 200, the message may be sent from the authenticated sender 100 and the message 121 may not be modified when the message 121 is transferred. Alternatively, when the message is not authenticated by the receiver 200, the message may not be sent from the authenticated sender 100 and the message 121 may be modified when the message 121 is transferred. For example, when the receiver 200 succeeds in message authentication, i.e., when the message passes the message authentication of the receiver 200, the receiver 200 may perform an operation instructed by the message.

The sender 100 may include a controller 110, a basic memory 120, a security engine 130, and a security memory 140. The controller 110 of the sender 100 may have an authority to access the basic memory 120 of the sender 100. For example, when the controller 110 of the sender 100 has the authority to access the basic memory 120 of the sender 100, the controller 110 of the sender 100 may be able to obtain information stored in the basic memory 120 of the sender 100. For example, the basic memory 120 of the sender 100 may store the message 121. The basic memory 120 of the sender 100 may be implemented with one of nonvolatile memories, e.g., an electrically erasable programmable read only memory (EEPROM), a flash memory, a ferroelectric RAM (FeRAM or FRAM), a magnetoresistive RAM (MRAM), a phase change RAM (PRAM), a resistive RAM (RRAM), and a Nano-RAM (NRAM).

The controller 110 of the sender 100 may control the security engine 130 of the sender 100. The security engine 130 of the sender 100 may generate the message authentication code 131 under the control of the controller 110 of the sender 100. For example, the security engine 130 of the sender 100 may have an authority to access the security memory 140 of the sender 100. Thus, the security engine 130 of the sender 100 may obtain information stored in the security memory 140 of the sender 100 under the control of the controller 110 of the sender 100. The security memory 140 of the sender 100 may store the key 141 of the sender 100. The security engine 130 of the sender 100 may generate the message authentication code 131 by using the key 141 obtained from the security memory 140 of the sender 100.

The security memory 140 of the sender 100 may be implemented with one of nonvolatile memories, e.g., an EEPROM, a flash memory, a FeRAM or FRAM, an MRAM, a PRAM, an RRAM, and an NRAM.

The controller 110 of the sender 100 may generate the security signal 300 based on the message 121 obtained from the basic memory 120 of the sender 100 and the message authentication code 131 received from the security engine 130 of the sender 100. The sender 100 may send the security signal 300 to the receiver 200.

For example, the receiver 200 may include a controller 210, a basic memory 220, a security engine 230, and a security memory 240. The receiver 200 may receive the security signal 300 from the sender 100. The security signal 300 may include the message 121 and the message authentication code 131. The basic memory 220 of the receiver 200 may store the message 121 and the message authentication code 131. The basic memory 220 of the receiver 200 may be implemented with one of nonvolatile memories, e.g., an EEPROM, a flash memory, a FeRAM or FRAM, an MRAM, a PRAM, an RRAM, and an NRAM.

The controller 210 of the receiver 200 may have an authority to access the basic memory 220 of the receiver 200. The controller 210 of the receiver 200 may authenticate the message 121 by using the message authentication code 131 stored in the basic memory 220 of the receiver 200. Further, the controller 210 of the receiver 200 may control the security engine 230 of the receiver 200. The security engine 230 of the receiver 200 may have an authority to access the security memory 240 of the receiver 200. The security engine 230 of the receiver 200 may obtain information stored in the security memory 240 of the receiver 200 under the control of the controller 210 of the receiver 200. The security memory 240 of the receiver 200 may store the key 241. The security engine 230 of the receiver 200 may generate information for message authentication of the controller 210 of the receiver 200 by using the key 241 obtained from the security memory 240 of the receiver 200. The security memory 240 of the receiver 200 may be implemented with one of nonvolatile memories, e.g., an EEPROM, a flash memory, a FeRAM or FRAM, an MRAM, a PRAM, an RRAM, and an NRAM.

The controller 210 of the receiver 200 may determine whether the message 121 is authenticated or not, based on the information generated by the security engine 230. For example, when the message 121 is authenticated, the receiver 200 may perform an operation indicated by the message 121. Alternatively, when the message 121 is not authenticated, the receiver 200 may not perform the operation indicated by the message 121. Further, the receiver 200 may delete the message 121 stored in the basic memory 220 of the receiver 200.

Figure 2:
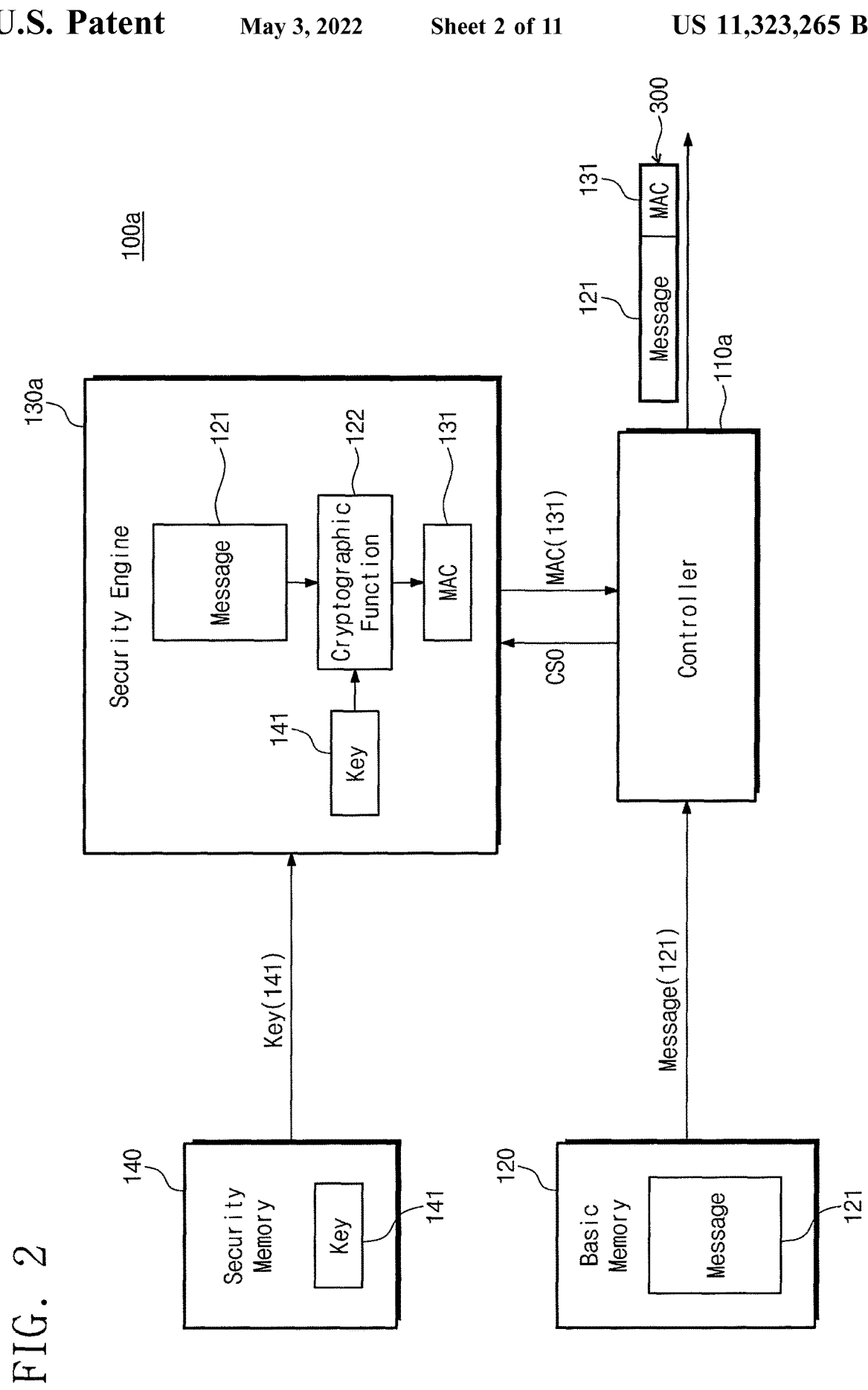
FIG. 2 illustrates a sender according to an example embodiment.

FIG. 2 illustrates a sender according to an example embodiment. Exemplary operations of a sender 100a for generating the security signal 300 will be described with reference to FIG. 2. For example, the sender 100a may include a controller 110a, the basic memory 120, the security memory 140, and a security engine 130a. The controller 110a may output a control signal CS0 to the security engine 130a. For example, when the control signal CS0 is received, the security engine 130a may generate the message authentication code 131.

Referring to FIG. 2, the security engine 130a of the sender 100a may have an authority to access the basic and security memories 120 and 140. Thus, the security engine 130a may obtain information stored in the basic and security memories 120 and 140.

The basic memory 120 may store the message 121 and a cryptographic function 122. Alternatively, the cryptographic function 122 may not be stored in the basic memory 120 but may be stored in the security memory 140. The cryptographic function 122 may be used for converting the message 121 into the message authentication code 131. For example, the cryptographic function 122 may perform a hash function, e.g., a message digest (MD) function or a secure hash algorithm (SHA).

The security memory 140 may store the key 141. For example, after the key 141 is stored in the security memory 140, the stored key 141 in the security memory 140 may not be updated or replaced with new data in the security memory 140. For example, the security memory 140 may be a one-time programmable (OTP) memory or a one-time programmable (OTP) area of the basic memory 120. For example, the OTP memory may permit data to be written only once and retain the written data without any power. Further, the OTP area of the basic memory 120 may be a memory area in which it is permanently impossible to store additional data after data are stored once.

Referring to FIG. 2, the security engine 130a of the sender 100a may receive the message 121, the cryptographic function 122, and the key 141 from the basic and security memories 120 and 140. The security engine 130a may generate the message authentication code 131 by using the message 121, the cryptographic function 122, and the key 141. For example, when the message 121 and the key 141 are provided to the cryptographic function 122, the message authentication code 131 may be generated by the cryptographic function 122 using a cryptographic algorithm, e.g., a hash function. Thus, information of the key 141 may be protected or secured by the cryptographic function 122.

A security protocol may be defined for communication between the security engine 130a and the controller 110a. For example, according to the security protocol, the security engine 130a may output only the message authentication code 131 to the controller 110a and may not output the key 141. Further, the security engine 130a may provide the controller 110a with other process results through which the key 141 is not predicted.

Referring to FIG. 2, the controller 110a of the sender 100a may receive the message authentication code 131 from the security engine 130a. The controller 110a may have an authority to access only one of the basic and security memories 120 and 140. For example, the controller 110a may have only an authority to access the basic memory 120. The controller 110a may obtain the message 121 stored in the basic memory 120. Alternatively, the controller 110a may have only an authority to access the security memory 140. Further, the controller 110a may merge the message 121 and the message authentication code 131 to generate the security signal 300. The controller 110a may encode the message 121 to generate the security signal 300. The controller 110a may send the security signal 300 to the receiver 200.

According to an example embodiment, the controller 110a may not have an authority to access the security memory 140. An access of the controller 110a to the security memory 140 may be blocked by the security engine 130a. For example, the controller 110a may fail to obtain the key 141 from the security memory 140. Further, the security engine 130a may not output the key 141 to the controller 110a in compliance with the protocol defined for the communication between the controller 110a and the security engine 130a. The security engine 130a may output only a processing result such that the controller 110a fails to predict the key 141. For example, the controller 110a may fail to obtain or predict the key 141. Thus, when the controller 110a is hacked by the attacker 400, the key 141 may not be exposed to the attacker 400, because the attacker 400 is not able to obtain the information of the key 141 through the controller 110a.

Further, the information of the key 141 may not be stored in the basic memory 120 because the controller 110a fails to obtain the key 141. Thus, the key 141 may not exposed to the attacker 400 or the outside even by a memory dump. The memory dump may refer to an operation in which pieces of information stored in the basic memory 120 are recorded at the outside or are open to the attacker 400. Therefore, the sender 100a according to an example embodiment may improve the security for the message 121 by securing the safety of the key 141, i.e., by protecting the key 141 from the hacking or the memory dump.

Figure 3:
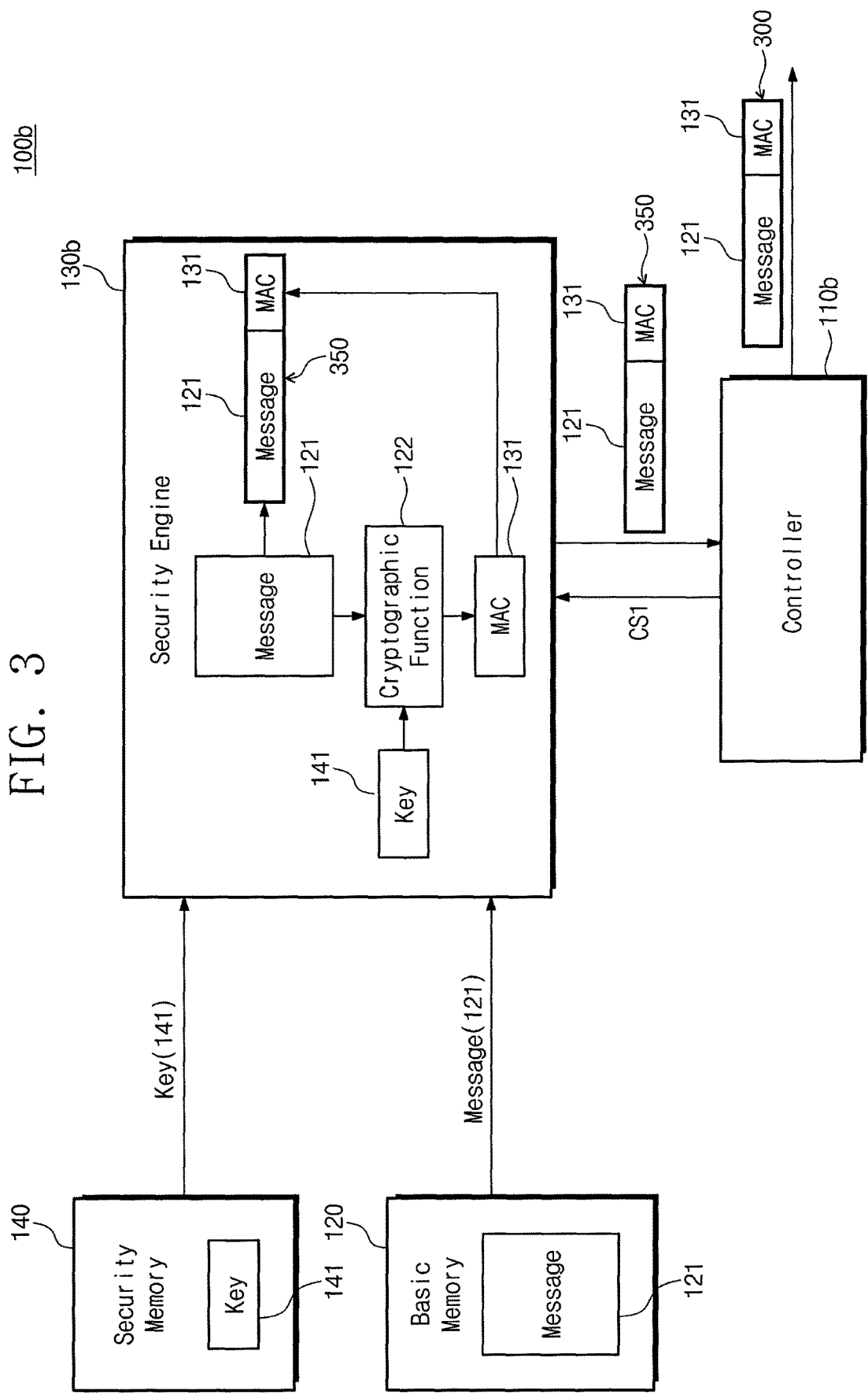
FIG. 3 illustrates a sender according to another example embodiment.

FIG. 3 illustrates a sender according to another example embodiment. Exemplary operations of a sender 100b for generating the security signal 300 will be described with reference to FIG. 3. A difference between operations of the sender 100b in FIG. 3 and the sender 100a in FIG. 2 will be described.

Referring to FIG. 3, a security engine 130b of the sender 100b may have an authority to access the basic and security memories 120 and 140. Thus, the security engine 130b may obtain information stored in the basic and security memories 120 and 140. The security engine 130b may receive the message 121, the cryptographic function 122, and the key 141 from the basic and security memories 120 and 140.

Referring to FIG. 3, a controller 110b of the sender 100b may output a control signal CS1 to the security engine 130b. When the control signal CS1 is received from the controller 110b, the security engine 130b may generate the message authentication code 131. The security engine 130b may generate the message authentication code 131 by using the message 121, the cryptographic function 122, and the key 141. For example, the cryptographic function 122 may generate the message authentication code 131 based on the message 121 and the key 141 such that the message 121 and the key 141 are secured. Further, while the security engine 130a of the sender 100a in FIG. 2 does not merge the message 121 and the message authentication code 131, the security engine 130b of the sender 100b in FIG. 3 may merge the message 121 and the message authentication code 131 after generating the message authentication code 131. The security engine 130b may merge the message 121 and the message authentication code 131 to generate merged data 350. The security engine 130b may output the merged data 350 to the controller 110b.

Referring to FIG. 3, the security engine 130b of the sender 100b may output only a processed result such that the key 141 is not predicted, in compliance with the security protocol. The merged data 350 may be processed data that are generated by the cryptographic function 122 of the security engine 130b. Thus, the key 141 may not be detected or predicted by the attacker 400. The security engine 130b may output the merged data 350 to the controller 110b in compliance with the security protocol.

The controller 110b may receive the merged data 350 from the security engine 130b and send the merged data 350 to send the security signal 300 to a receiver (e.g., the receiver 200 in FIG. 1). Thus, the controller 110b may fail to obtain or predict the key 141, because the key 141 is secured or encrypted by the cryptographic function 122 and the encrypted key is included in the merged data 350. Thus, if the controller 110*b* is hacked by the attacker 400, the key 141 is not exposed to the attacker 400.

Further, because the controller 110*b* fails to obtain the key 141, information of the key 141 may not be stored in the basic memory 120. Thus, the key 141 may not be exposed to the attacker 400 or the outside even by the memory dump.

According to an example embodiment, referring to FIG. 3, the controller 110*b* of the sender 100*b* may not have an authority to access both the basic memory 120 and the security memory 140. An access of the controller 110*b* to the basic and security memories 120 and 40 may be blocked by the security engine 130*b*. The controller 110*b* may fail to obtain the key 141 from the security memory 140 and fail to obtain the message 121 from the basic memory 120. Thus, when the controller 110*b* is hacked by an attacker (e.g., the attacker 400 in FIG. 1), the key 141 and the message 121 may not be exposed to the attacker, because the attacker is not able to obtain the information of the key 141 and the message 121 through the controller 110*b*.

Figure 4:
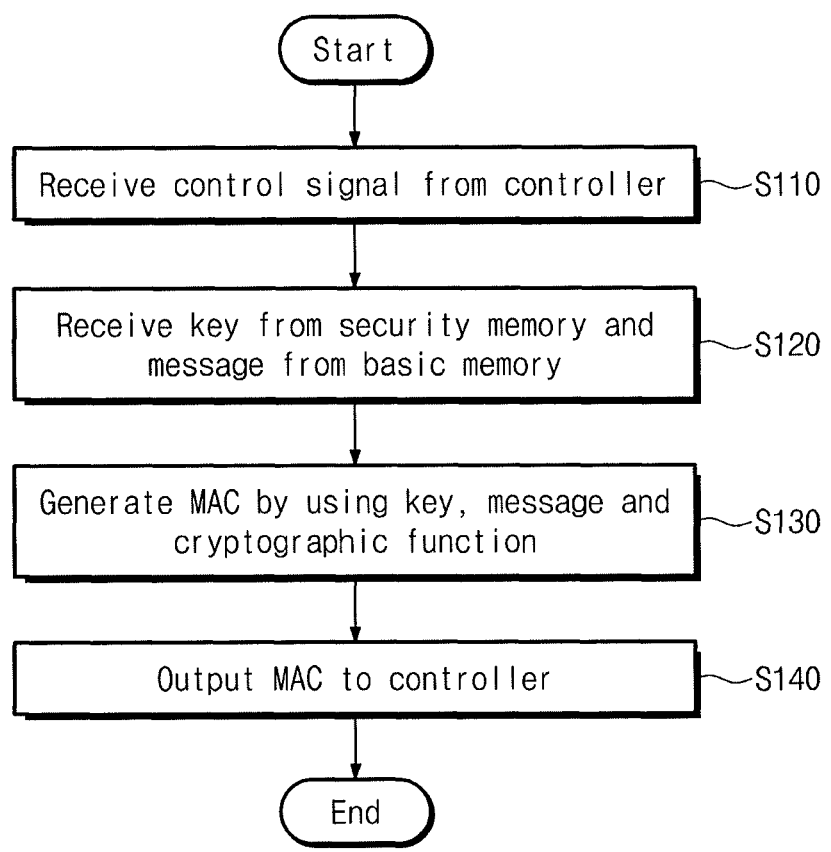
FIG. 4 illustrates a flowchart for describing operations of a security engine in FIG. 2.

FIG. 4 illustrates a flowchart for describing operations of a security engine in FIG. 2. Referring to FIG. 4, in operation S110, the security engine 130*a* of the sender 100*a* in FIG. 2 may receive the control signal CS0 from the controller 110*a*.

Referring to FIG. 4, in operation S120, the security engine 130*a* of the sender 100*a* in FIG. 2 may request the key 141 from the security memory 140. The security engine 130*a* may receive the key 141 from the security memory 140. The security engine 130*a* may request the message 121 from the basic memory 120. The security engine 130*a* may receive the message 121 from the basic memory 120. Further, the security engine 130*a* may receive information regarding the cryptographic function 122 from the basic memory 120 or the security memory 140.

Referring to FIG. 4, in operation S130, the security engine 130*a* of the sender 100*a* in FIG. 2 may provide the message 121 and the key 141 to the cryptographic function 122. The cryptographic function 122 may generate the message authentication code 131 based on the message 121 and the key 141.

Referring to FIG. 4, in operation S140, the security engine 130*a* of the sender 100*a* in FIG. 2 may output the message authentication code 131 to the controller 110*a* of the sender 100*a* in FIG. 2 in compliance with the security protocol.

Figure 5:
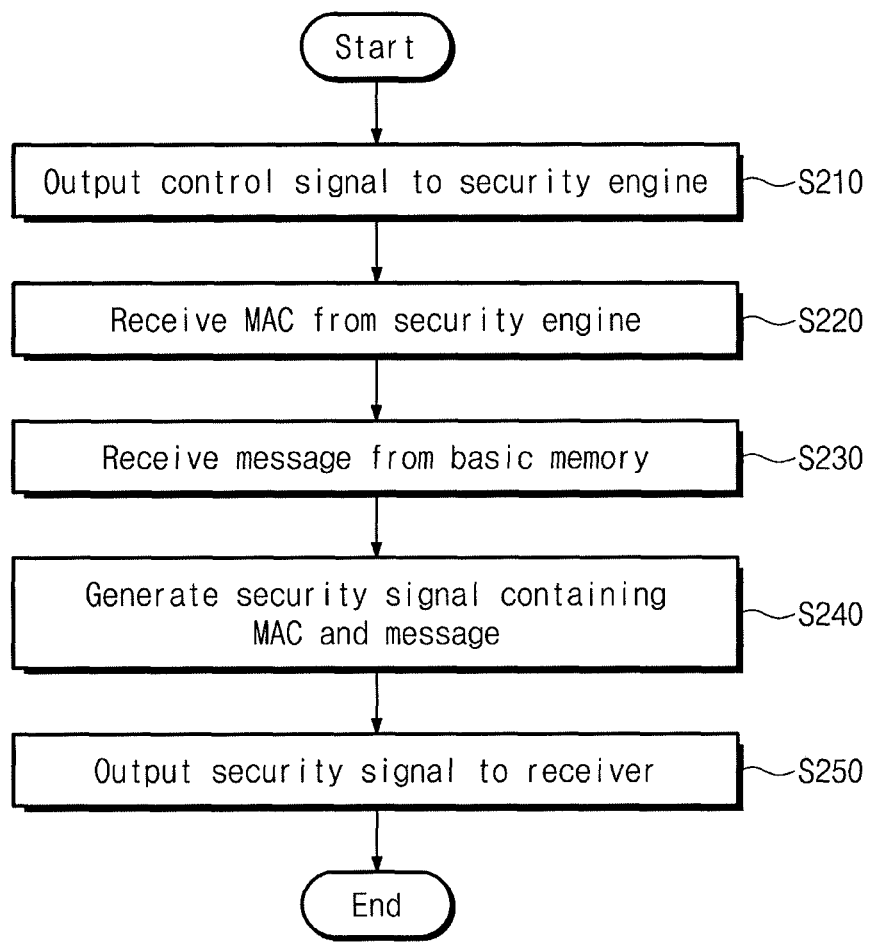
FIG. 5 illustrates a flowchart for describing operations of a controller in FIG. 2.

FIG. 5 illustrates a flowchart for describing operations of the controller in FIG. 2. Referring to FIG. 5, in operation S210, the controller 110*a* of the sender 100*a* in FIG. 2 may output the control signal CS0 to the security engine 130*a*. For example, the control signal CS0 may be used for generating the security signal 300.

Referring to FIG. 5, in operation S220, the controller 110*a* of the sender 100*a* in FIG. 2 may receive the message authentication code 131 from the security engine 130*a*. In operation S230, the controller 110*a* of the sender 100*a* in FIG. 2 may request the message 121 from the basic memory 120. The controller 110*a* of the sender 100*a* in FIG. 2 may receive the message 121 from the basic memory 120. In operation S240, the controller 110*a* of the sender 100*a* in FIG. 2 may merge the message 121 and the message authentication code 131 to generate the security signal 300. In operation S250, the sender 100*a* in FIG. 2 may send the security signal 300 to the receiver 200 in FIG. 1.

Figure 6:
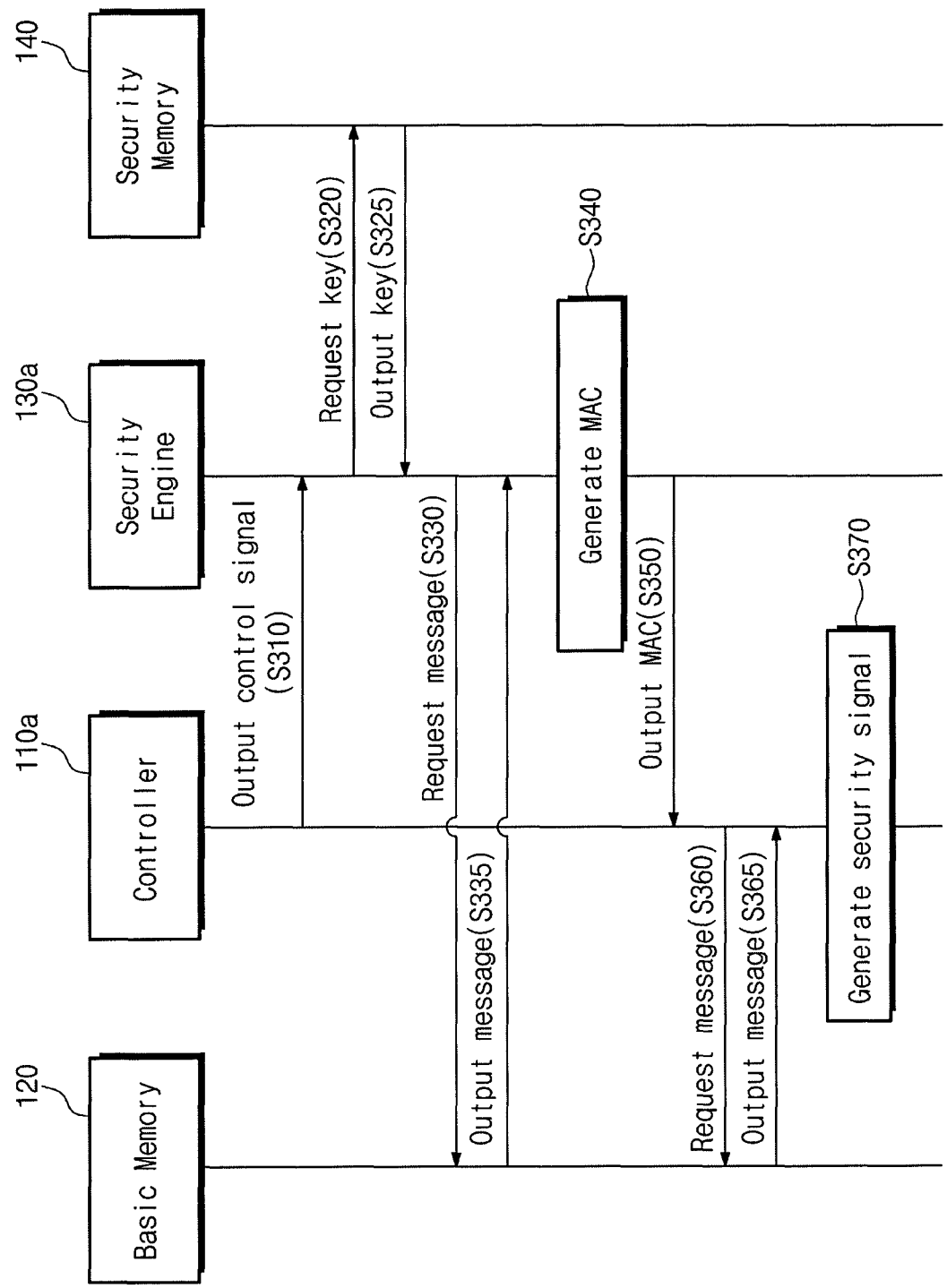
FIG. 6 illustrates a flowchart for describing operations of the sender in FIG. 2.

FIG. 6 illustrates a flowchart for describing operations of the sender 100*a* in FIG. 2. Referring to FIG. 6, in operation S310, the controller 110*a* of the sender 100*a* in FIG. 2 may output the control signal CS0 to the security engine 130*a*. In operation S320, the security engine 130*a* of the sender 100*a* in FIG. 2 may request the key 141 from the security memory 140. In operation S325, the security memory 140 in FIG. 2 may output the key 141 to the security engine 130*a* in response to the request of the security engine 130*a*.

Further, referring to FIG. 6, in operation S330, the security engine 130*a* in FIG. 2 may request the message 121 from the basic memory 120. In operation S335, the basic memory 120 in FIG. 2 may output the message 121 to the security engine 130*a* in response to the request of the security engine 130*a*. In operation S340, the security engine 130*a* in FIG. 2 may generate the message authentication code 131 by using the key 141 and the message 121. In operation S350, the security engine 130*a* in FIG. 2 may output the message authentication code 131 to the controller 110*a*.

Further, referring to FIG. 6, in operation S360, the controller 110*a* in FIG. 2 may request the message 121 from the basic memory 120. In operation S365, the basic memory 120 in FIG. 2 may output the message 121 to the security engine 130*a*. In operation S370, the controller 110*a* in FIG. 2 may generate the security signal 300 by using the message 121 and the message authentication code 131. The controller 110*a* in FIG. 2 may send the security signal 300 to the receiver 200 in FIG. 1.

Figure 7:
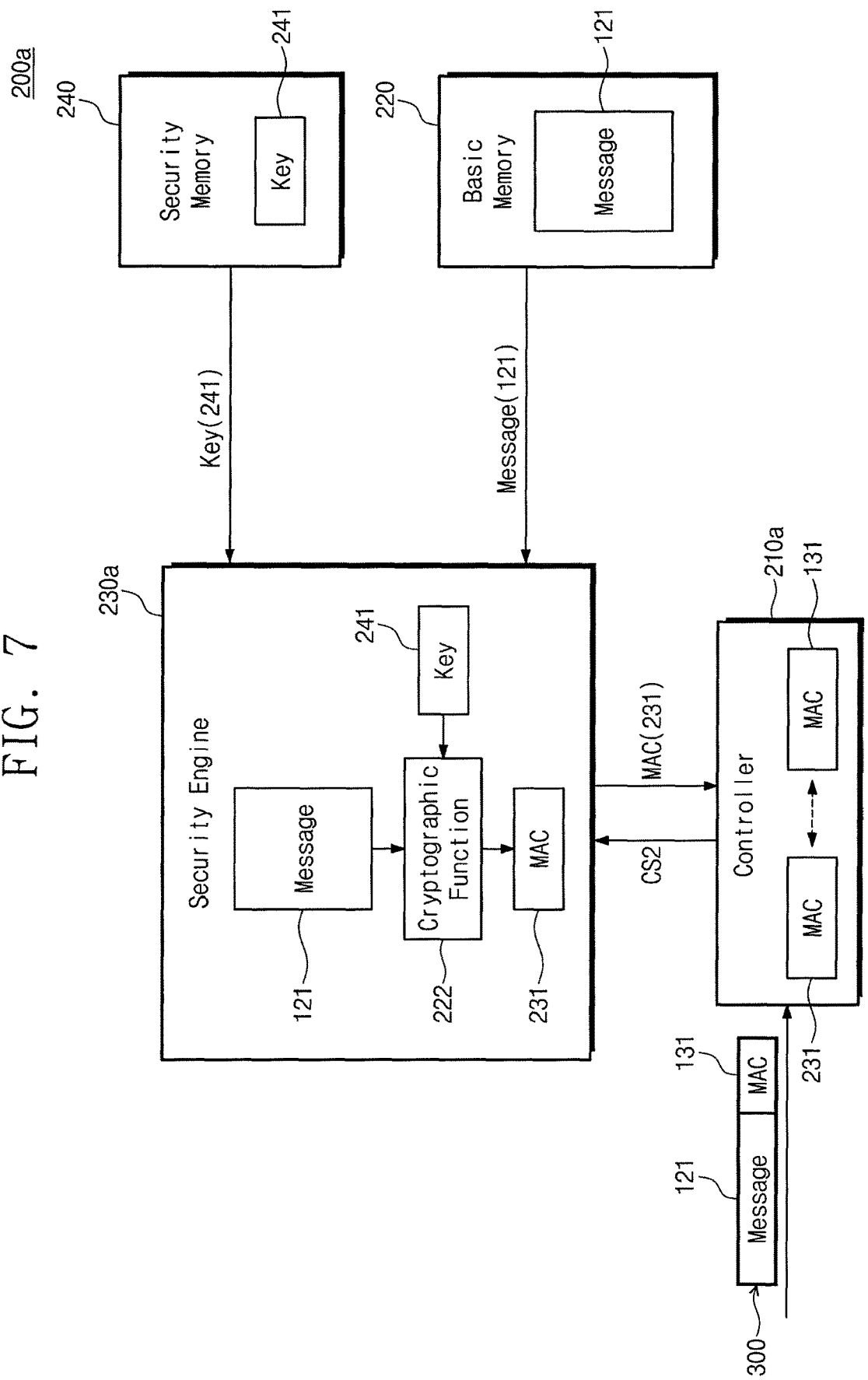
FIG. 7 illustrates a receiver according to an example embodiment.

FIG. 7 illustrates a receiver according to an example embodiment. Operations of a receiver 200*a* for checking the message 121 will be described with reference to FIG. 7. The receiver 200*a* may correspond to an embodiment of the receiver 200 in FIG. 1.

For example, the receiver 200*a* may receive the security signal 300 from a sender (e.g., the sender 100 in FIG. 1, the sender 100*a* in FIG. 2, and the sender 100*b* in FIG. 3). The security signal 300 may include the message 121 and the message authentication code 131. For example, when the security signal 300 is received by the receiver 200*a*, a controller 210*a* of the receiver 200*a* may output a control signal CS2 to a security engine 230*a*. Further, when the control signal CS2 is received by the security engine 230*a*, the security engine 230*a* may generate a message authentication code 231 based on the message 121 and the key 241. The controller 210*a* may determine whether the message 121 of the security signal 300 is authenticated or not based on the message authentication code 231 from the security engine 230*a*.

For example, the security engine 230*a* may have an authority to access the security memory 240. The security memory 240 may store the key 241. The security engine 230*a* may request the key 241 from the security memory 240 for generating the message authentication code 231. The security engine 230*a* may request the key 241 from the security memory 240. The key 241 in FIG. 7 may correspond to the key 141 in FIG. 2. For example, when the key 241 is stored in the security memory 240, the key 241 in the security memory 240 may not be updated or replaced with new data. For example, the security memory 240 may be an OTP memory or an OTP area of the basic memory 220. The OTP area of the basic memory 220 may be an area in which it is permanently impossible to store additional data after data are stored once.

For example, the security engine 230*a* may have an authority to access the basic memory 220. The basic memory 220 may store the message 121 received from the sender 100 and the message authentication code 131. Further, the basic memory 220 may store information for a cryptographic function 222. The cryptographic function 222 may generate the message authentication code 231 based on the message 121 and the key 241. For example, the cryptographic function 222 in FIG. 7 may correspond to the cryptographic function 122 in FIG. 2. For example, the cryptographic function 222 may be a hash function, e.g., an MD function or an SHA.

For example, the security engine 230a may request the message 121 and the cryptographic function 222 from the basic memory 220 for generating the message authentication code 231. The security engine 230a may receive the message 121 and the cryptographic function 222 from the basic memory 220. Alternatively, the cryptographic function 222 may not be stored in the basic memory 220 but may be stored in the security memory 240. The security engine 230a may receive the cryptographic function 222 from the security memory 240.

The security engine 230a may generate the message authentication code 231 by using the key 241, the message 121, and the cryptographic function 222. For example, when the message 121 and the key 241 are provided to the cryptographic function 222, the message authentication code 231 may be generated by the cryptographic function 222.

A security protocol may be defined for communication between the security engine 230a and the controller 210a. According to the security protocol, the security engine 230a may be able to output only the message authentication code 231 to the controller 210a and fail to output the key 241. Further, for example, the security engine 230a may provide the controller 210a with any other results that are processed to protect or secure the key 241.

For example, the controller 210a may receive the message authentication code 231 from the security engine 230a. The controller 210a may have an authority to access only one of the memories 220 and 240. For example, the controller 210a may have only an authority to access the basic memory 220. Thus, the controller 210a may request the message authentication code 131 from the basic memory 220. The controller 210a may receive the message authentication code 131 from the basic memory 220. The message authentication code 131 may be a message authentication code received from the outside of the receiver 200 (e.g., the sender 100 in FIG. 1, the sender 100a in FIG. 2, and the sender 100b in FIG. 3). The message authentication code 231 may be a message authentication code that is generated or calculated in the receiver 200a (e.g., in the security engine 230a).

Alternatively, the basic memory 220 may not store the message authentication code 131. The message authentication code 131 may be stored in a memory of the controller 210a. Thus, the controller 210a may not request the message authentication code 131 from the basic memory 220.

The controller 210a may compare the message authentication code 131 and the message authentication code 231 for checking the message 121. The controller 210a may identify whether the message authentication code 131 is matched with the message authentication code 231. When the message 121 is output from the authenticated sender 100 and is not modified by the attacker 400 in FIG. 1, the message authentication code 131 may be matched with the message authentication code 231. In contrast, when the message 121 is not a message output from the authenticated sender 100 or is modified by the attacker 400 in FIG. 1, the message authentication code 131 may not be matched with the message authentication code 231. Thus, the controller 210a may determine whether the message 121 is authenticated or not, based on whether the message authentication code 131 is matched with the message authentication code 231.

When the message authentication code 131 is matched with the message authentication code 231, the controller 210a may authenticate the message 121. When the message 121 is completely authenticated by the controller 210a, the controller 210a may output a signal for performing an operation that the message 121 indicates. The receiver 200a may perform an operation indicated by the message 121, based on the signal output from the controller 210a.

When the message authentication code 131 is not matched with the message authentication code 231, the controller 210a may not authenticate the message 121. When the controller 210a does not authenticate the message 121, the receiver 200a may not perform the operation indicated by the message 121. Further, the controller 210a may control the basic memory 220 such that the message 121 stored in the basic memory 220 is deleted.

According to an example embodiment, the controller 210a fails to have an authority to access the security memory 240. An access of the controller 210a to the security memory 240 may be blocked by the security engine 230a. For example, the controller 210a may fail to obtain the key 241 from the security memory 240. Further, the security engine 230a may fail to output the key 241 to the controller 210a in compliance with the protocol defined between the controller 210a and the security engine 230a. The security engine 130a may output only a processing result such that the controller 210a fails to predict the key 241. Thus, the controller 210a may fail to obtain or predict the key 241. Thus, when the controller 210a is hacked by the attacker 400, the key 241 may not be exposed to the attacker 400.

Because the controller 210a fails to obtain the key 241, information of the key 241 may not be stored in the basic memory 220. For example, the key 241 may not be exposed to the attacker 400 or the outside even by the memory dump. Thus, the receiver 200a according to an example embodiment may secure the safety of the key 241. Because the safety of the keys 141 and 241 is secured, the receiver 200a may determine whether the message 121 is sent from the authenticated sender 100 and whether the message 121 is not modified with high accuracy.

Figure 8:
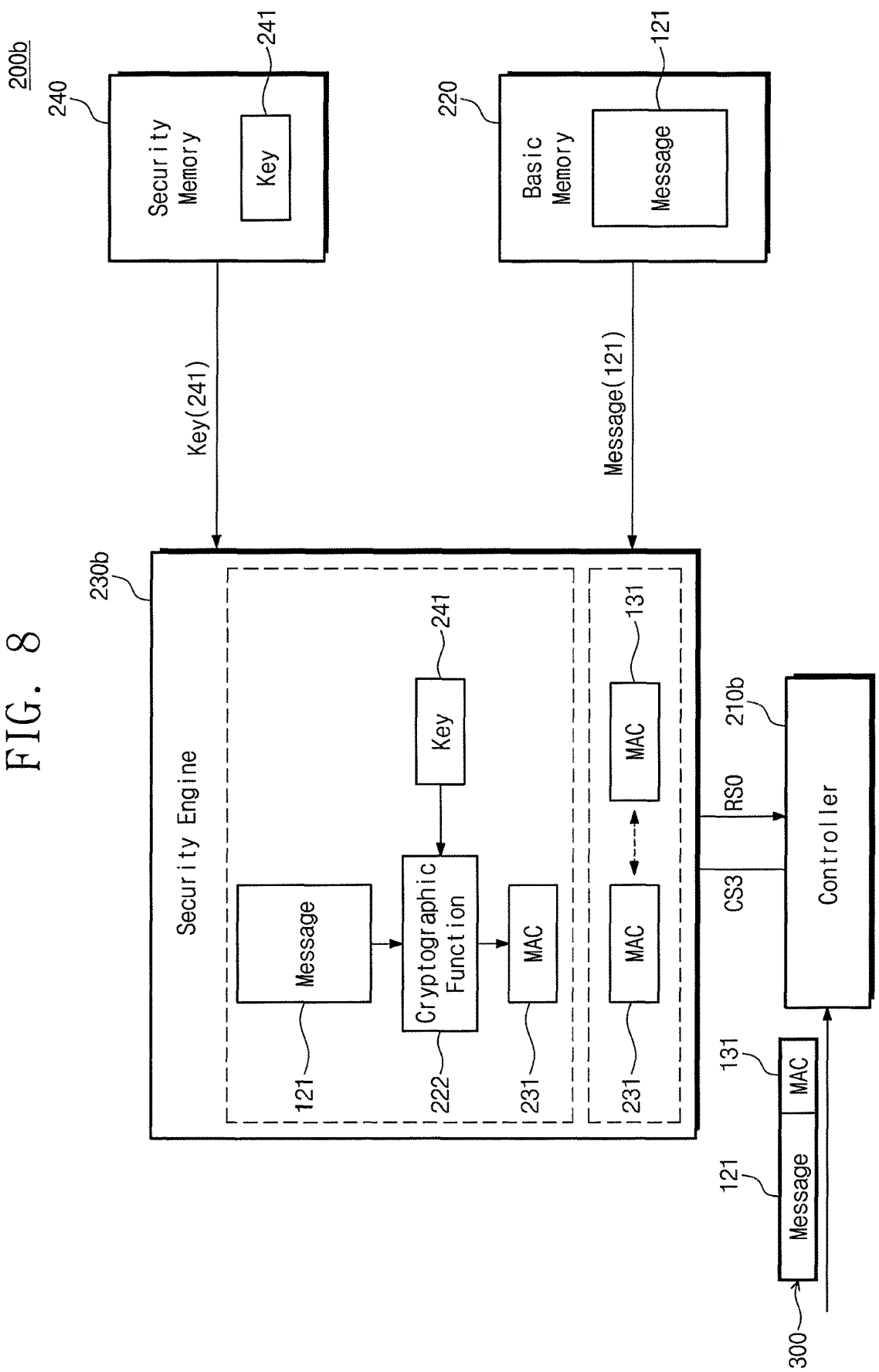
FIG. 8 illustrates a receiver according to another example embodiment.

FIG. 8 illustrates a receiver according to another example embodiment. Operations of a receiver 200b for checking the message 121 will be described with reference to FIG. 8. The receiver 200b may correspond to an embodiment of the receiver 200 in FIG. 1. A difference between operations of the receiver 200b described with reference to FIG. 8 and the operations of the receiver 200a described with reference to FIG. 7 will be mainly described.

When the security signal 300 is received, a controller 210b may output a control signal CS3 to a security engine 230b. When the control signal CS3 is received, the security engine 230b may generate the message authentication code 231.

The security engine 230b may have an authority to access the basic and security memories 220 and 240 in FIG. 8. Thus, the security engine 230b may obtain information stored in the basic and security memories 220 and 240. The security engine 230b may receive the message 121, the cryptographic function 222, and the key 241 from the memories 220 and 240. The security engine 230b may generate the message authentication code 231 by using the message 121, the cryptographic function 222, and the key 241. Further, while the security engine 230a in FIG. 7 does not compare the message authentication code 131 and the message authentication code 231, the security engine 230b may compare the message authentication code 131 and the message authentication code 231 after generating the message authentication code 231.

The security engine 230b may request the message authentication code 231 from the basic memory 220. The security engine 230b may receive the message authentication code 231 from the basic memory 220. The security engine 230b may identify whether the message authentication code 131 is matched with the message authentication code 231. As described with reference to FIG. 7, when the message 121 is output from the authenticated sender 100 and is not modified by the attacker 400 in FIG. 1, the message authentication code 131 stored in the basic memory 220 may be matched with the message authentication code 231 generated by the security engine 230b. In contrast, when the message 121 is not a message output from the authenticated sender 100 or is modified by the attacker 400 in FIG. 1, the message authentication code 131 may not be matched with the message authentication code 231.

For example, the security engine 230b may generate a result signal RS0, based on a result of comparing the message authentication code 131 with the message authentication code 231. The result signal RS0 may indicate whether the message authentication code 131 is matched with the message authentication code 231. For example, when the result signal RS0 has a first logical value or a first voltage level, the message authentication code 131 may be matched with the message authentication code 231. Further, when the result signal RS0 has a second logical value or a second voltage level, the message authentication code 131 may not be matched with the message authentication code 231. The first logical value may be different from the second logical value, and the first voltage level may be different from the second voltage level.

The security engine 230b may output the result signal RS0 to the controller 210b in compliance with the security protocol. The result signal RS0 in FIG. 8 may correspond to the message authentication code 231 in FIG. 7 and may be processed such that the key 241 included in the message authentication code 231 is secured and encrypted.

The controller 210b may receive the result signal RS0. The controller 210b may determine whether the message 121 is authenticated or not, based on a logical value of the result signal RS0 or a voltage level of the result signal RS0.

When the result signal RS0 has the first logical value or the first voltage level, the controller 210b may authenticate the message 121. Further, when the message 121 is completely authenticated by the controller 210b, the controller 210b may output a signal for performing an operation indicated by the message 121. The receiver 200b may perform an operation indicated by the message 121, based on the signal output from the controller 210b.

When the result signal RS0 has the second logical value or the second voltage level, the controller 210b may not authenticate the message 121. Further, when the controller 210b does not authenticate the message 121, the receiver 200b may not perform the operation indicated by the message 121. For example, the controller 210b may control the basic memory 220 to delete the message 121 stored in the basic memory 220.

Thus, the controller 210b may fail to obtain or predict the key 241. Therefore, when the controller 210b is hacked by the attacker 400, the key 241 may not be exposed to the attacker 400. Because the controller 210b fails to obtain the key 241, information of the key 241 may not be stored in the basic memory 220. Thus, the key 241 may not be exposed to the attacker 400 or the outside even by the memory dump.

Figure 9:
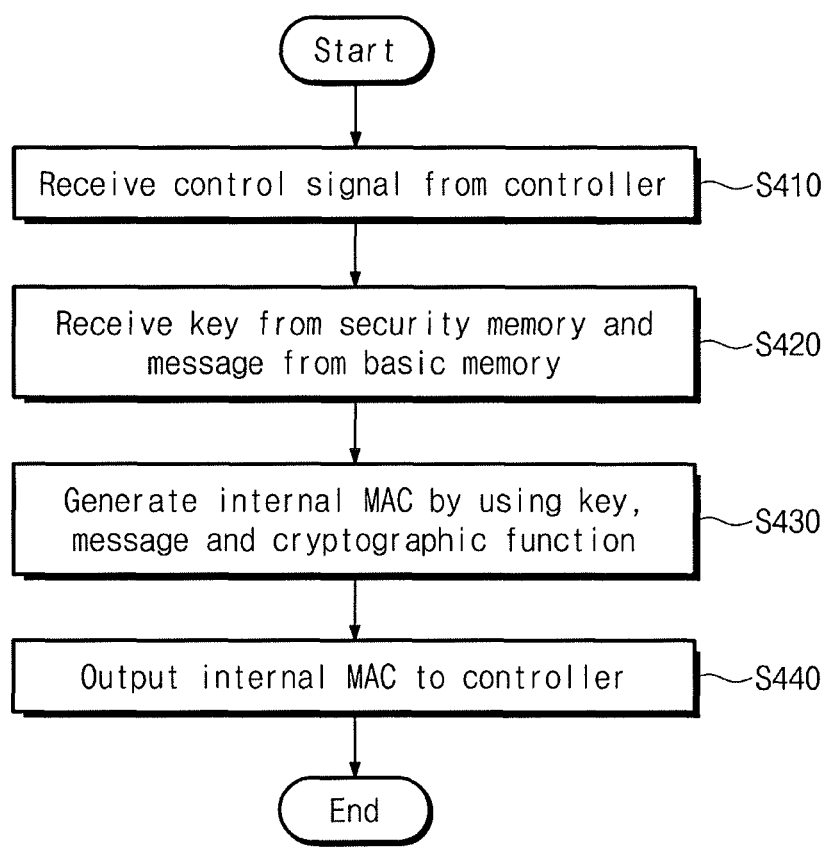
FIG. 9 illustrates a flowchart for describing operations of a security engine in FIG. 7.

FIG. 9 illustrates a flowchart for describing operations of a security engine in FIG. 7. Referring to FIG. 9, in operation S410, the security engine 230a may receive the control signal CS2 from the controller 210a.

In operation S420, the security engine 230a may request the key 241 from the security memory 240. The security engine 230a may receive the key 241 from the security memory 240. The security engine 230a may request the message 121 from the basic memory 220. The security engine 230a may receive the message 121 from the basic memory 220. Further, the security engine 230a may receive information of the cryptographic function 222 from the basic memory 220 or the security memory 240.

In operation S430, the security engine 230a may provide the message 121 and the key 241 to the cryptographic function 222. The cryptographic function 222 may generate the message authentication code 231 based on the message 121 and the key 241. In operation S440, the security engine 230a may output the message authentication code 231 to the controller 210a in compliance with the security protocol.

Figure 10:
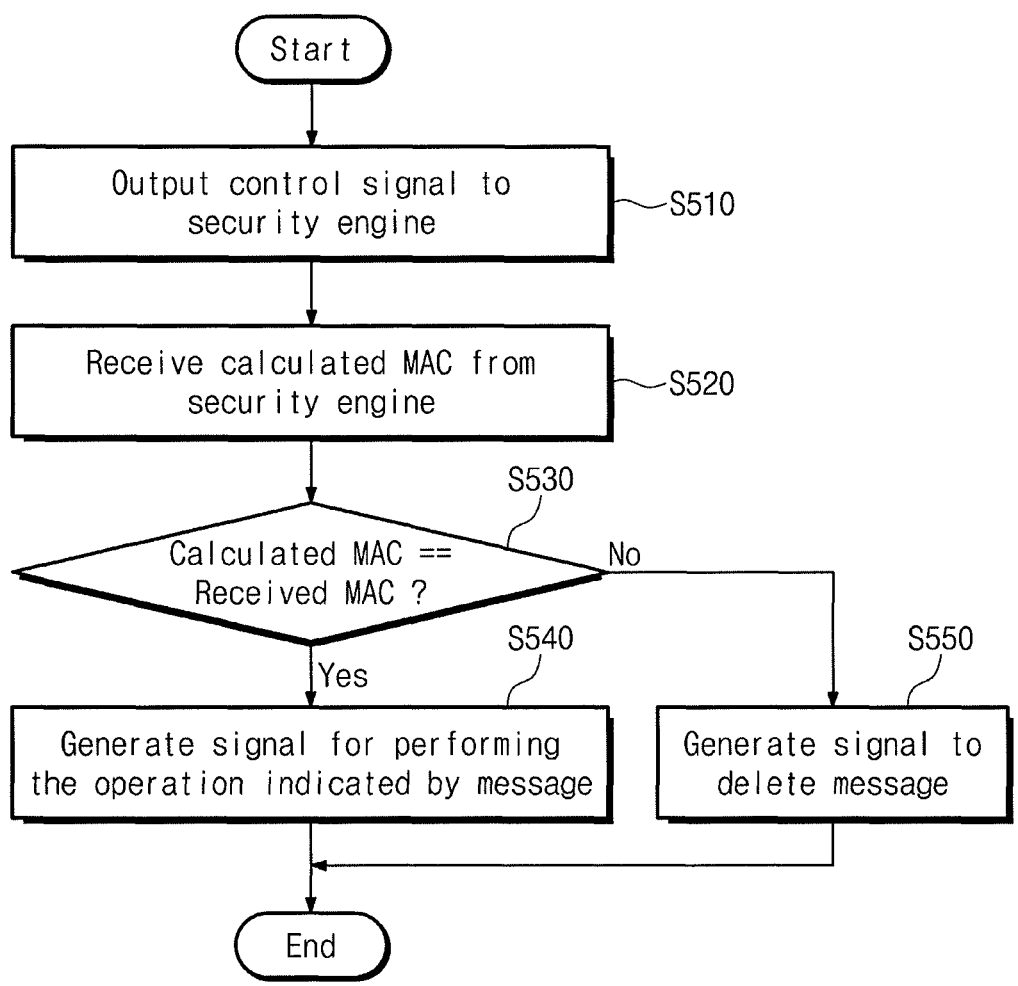
FIG. 10 illustrates a flowchart for describing operations of a controller in FIG. 7.

FIG. 10 illustrates a flowchart for describing operations of a controller in FIG. 7. Referring to FIG. 10, in operation S510, the controller 210a may output the control signal CS2 to the security engine 230a.

In operation S520, the security engine 230a may generate the message authentication code 231 in response to the control signal CS2. The controller 210a may receive the message authentication code 231. In operation S530, the controller 210a may compare the message authentication code 131 and the message authentication code 231. The controller 210a may receive the message authentication code 131 from the outside (e.g., the sender 100). The message authentication code 131 and the message authentication code 231 may be expressed as a received message authentication code and a calculated message authentication code, respectively.

When the message authentication code 131 is matched with the message authentication code 231, the procedure may proceed to operation S540. In operation S540, the controller 210a may generate a signal for performing an operation indicated by the message 121.

When the message authentication code 131 is not matched with the message authentication code 231, the procedure may proceed to operation S550. In operation S550, the controller 210a may generate a signal for deleting the message 121 stored in the basic memory 220.

Figure 11:
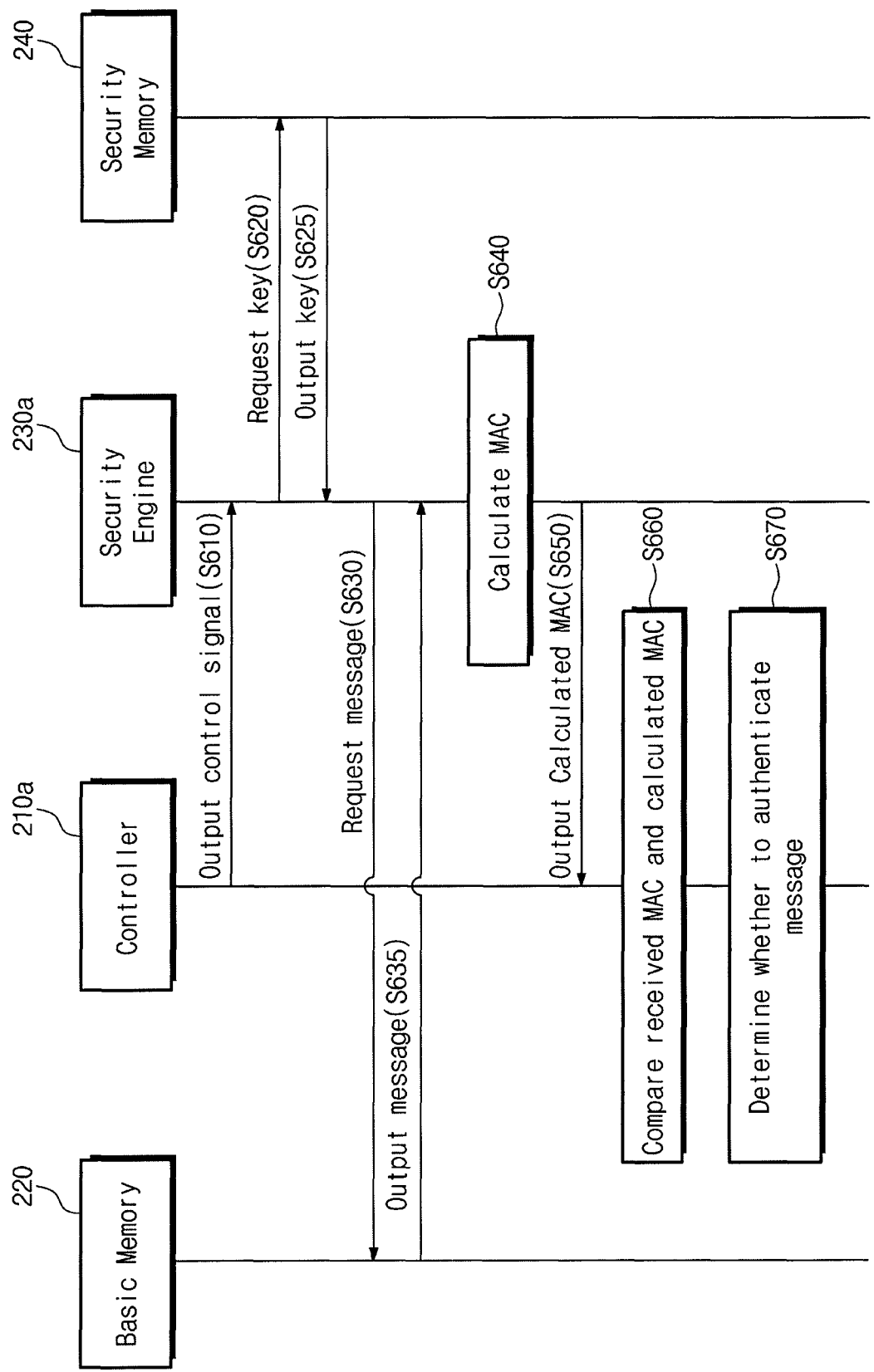
FIG. 11 illustrates a flowchart for describing operations of the receiver in FIG. 7.

FIG. 11 illustrates a flowchart for describing operations of a receiver in FIG. 7. Referring to FIG. 11, in operation S610, the controller 210a may output the control signal CS2 to the security engine 230a. In operation S620, the security engine 230a may request the key 241 from the security memory 240. In operation S625, the security memory 240 may output the key 241 to the security engine 230a in response to the request of the security engine 230a.

For example, in operation S630, the security engine 230a may request the message 121 from the basic memory 220. In operation S635, the basic memory 220 may output the message 121 to the security engine 230a in response to the request of the security engine 230a. In operation S640, the security engine 230a may calculate the message authentication code 231 by using the key 241 and the message 121. The message authentication code 231 may be expressed as a calculated message authentication code. In operation S650, the security engine 230a may output the message authentication code 231 to the controller 210a.

Further, in operation S660, the controller 210a may compare the message authentication code 131 and the message authentication code 231. The controller 210a may receive the message authentication code 231 from the security engine 230a. Further, the controller 210a may receive the message authentication code 131 from the outside (e.g., the sender 100). The message authentication code 131 may be expressed as a received message authentication code. In operation S670, the controller 210a may determine whether the message 121 is authenticated or not, based on a result of the comparison.

According to an example embodiment, because a controller fails to obtain or predict an authentication key, the authentication key may not be exposed to an attacker when the controller is hacked. Further, because the authentication key is not stored in a basic memory, the authentication key may not be exposed to the attacker through a memory dump. Thus, a storage device according to an example embodiment may provide high security by improving safety of the authentication key.

Various operations of methods described above may be performed as is suitable, such as by various hardware and/or software components, modules, and/or circuits. When implemented in software, the operations may be implemented using, for example, an ordered listing of executable instructions for implementing logical functions, and may be embodied in a processor-readable medium for use by or in connection with an instruction execution system, apparatus, or device, such as a single or multiple-core processor or processor-containing system.

In some embodiments, blocks or steps of a method or algorithm and functions described in connection with the embodiments disclosed herein may be embodied directly in hardware, in a software module executed by a processor, or in a combination of software and hardware. If implemented in software, the functions may be stored on or transmitted over as one or more instructions or code on a tangible, non-transitory computer-readable medium. A software module may reside in, for example, Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other suitable form of storage medium.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A storage device, comprising:
a basic memory to store a message received from an external device;
a security memory to store an authentication key for authenticating the message;
a controller to output a control signal; and
a security engine with an authority to access the security memory, the security engine to obtain the authentication key from the security memory in response to the control signal from the controller, and to block an access of the controller to the security memory,
wherein:
the security engine is to calculate a message authentication code based on the message and the authentication key, and to compare the calculated message authentication code with a message authentication code sent from the external device,
the security engine is to output a comparison result obtained by the comparing of the calculated message authentication code with the message authentication code sent from the external device, and
the controller is to determine whether the message is authenticated, based on the comparison result.

2. The storage device as claimed in claim 1, wherein the security engine is to block transferring the authentication key from the security memory to the controller.

3. The storage device as claimed in claim 1, wherein the basic memory and the security memory are each a nonvolatile memory.

4. The storage device as claimed in claim 1, wherein:
the controller is to determine whether the message is authenticated, based on a comparison result output by the security engine based on the comparing of the calculated message authentication code with the message authentication code sent from the external device.

5. The storage device as claimed in claim 1, wherein the basic memory and the security memory operate independently from each other.

6. The storage device as claimed in claim 1, wherein the security memory and the basic memory are included in a same memory device, and
the security memory corresponds to a one-time programmable (OTP) area of the same memory device.

7. The storage device as claimed in claim 1, wherein the authentication key is stored in the security memory only once and is maintained.

8. The storage device as claimed in claim 1, wherein the authentication key is stored only in the security memory among the basic memory and the security memory.

9. A storage device, comprising:
a basic memory to store a message received from an external device;
a security memory to store an authentication key for authenticating the message;
a controller to output a control signal; and
a security engine with an authority to access the security memory, the security engine to obtain the authentication key from the security memory in response to the control signal from the controller, and to block an access of the controller to the security memory,
wherein:
the security engine is to calculate a message authentication code based on the message and the authentication key, and to compare the calculated message authentication code with a message authentication code sent from the external device, and
the controller is to determine whether the message is authenticated, based on a comparison result output by the security engine based on the comparing of the calculated message authentication code with the message authentication code sent from the external device.

* * * * *